(12) United States Patent
Castillo et al.

(10) Patent No.: US 7,374,080 B2
(45) Date of Patent: May 20, 2008

(54) SYSTEM AND METHOD FOR SECURING THE INITIALIZATION OF AN INHERENTLY NON-SECURE SMARTCARD CONTROLLER

(75) Inventors: Daniel A. Castillo, Dallas, TX (US); Keith R. Mowery, Plano, TX (US); Cheng L. Xu, Irving, TX (US)

(73) Assignee: Texas Instruments Incorporated, Dallas, TX (US)

( * ) Notice: Subject to any disclaimer, the term of this patent is extended or adjusted under 35 U.S.C. 154(b) by 482 days.

(21) Appl. No.: 10/986,102

(22) Filed: Nov. 10, 2004

(65) Prior Publication Data

US 2006/0097040 A1    May 11, 2006

(51) Int. Cl.
*G06K 5/10* (2006.01)
(52) U.S. Cl. .............. 235/380; 235/379; 709/321; 713/2; 713/170; 713/176; 713/193
(58) Field of Classification Search ........... 235/379, 235/380; 709/321; 713/2, 170, 176, 193
See application file for complete search history.

(56) References Cited

U.S. PATENT DOCUMENTS 6,574,677 B1*   6/2003 Song et al. ............. 710/8
2003/0084440 A1*   5/2003 Lownes ................. 725/6
2003/0116621 A1*   6/2003 Duncan ............... 235/379
2003/0159044 A1*   8/2003 Doyle et al. .......... 713/176
2003/0159057 A1*   8/2003 Mangold et al. ...... 713/193
2003/0217193 A1*  11/2003 Thurston et al. ..... 709/321
2005/0044363 A1*   2/2005 Zimmer et al. ....... 713/170
2006/0010317 A1*   1/2006 Lee ........................ 713/2

* cited by examiner

*Primary Examiner*—Michael G. Lee
*Assistant Examiner*—Allyson N Trail
(74) *Attorney, Agent, or Firm*—William B. Kempler; W. James Brady, III; Frederick J. Telecky, Jr.

(57) ABSTRACT

A system and method for securing the initialization of a Smartcard controller and a Smartcard terminal incorporating the system or the method. In one embodiment, the system includes: (1) a firmware loader associated with a Smartcard controller and configured to receive and authenticate firmware and provide an associated Smartcard driver digital signature and (2) a Smartcard driver associated with the Smartcard controller and configured to be authenticated using the Smartcard driver digital signature and authenticate the firmware.

19 Claims, 3 Drawing Sheets

SYSTEM AND METHOD FOR SECURING THE INITIALIZATION OF AN INHERENTLY NON-SECURE SMARTCARD CONTROLLER

TECHNICAL FIELD OF THE INVENTION

The present invention is directed, in general, to a and, more specifically, to a system and method for securing the initialization of an inherently non-secure Smartcard controller.

BACKGROUND OF THE INVENTION

Smartcards are rapidly becoming a favored way to transport and communicate personal information securely and reliably. Smartcards assume the general size and shape of a conventional credit card but include data processing and storage circuitry that allows them to receive, process, store and transmit information. By virtue of their size, information-carrying capacity and security, Smartcards are destined for use in financial (e.g., banking) transactions, official identification and healthcare delivery, among other things. International Standards Organization (ISO) Standards 7810, 7816/1 and 7816/2 specify the physical structure and hardware and software architecture of Smartcards and are incorporated herein by reference.

Smartcards receive and transmit information by being coupled to a "cardbus." ISO Standards 7816/1 and 7816/2 also specify the structure and communication protocol(s) of cardbuses. Since security is touted as one of the hallmarks of Smartcards, the above-referenced standards provide for a reasonably high level of security of data crossing a cardbus. In addition, Deutsch Telecom has created a certification process, called "B," that establishes a security level for Smartcard terminals as a whole. Compliance with B1 affords a distinct competitive advantage.

Personal computers (PCs) can advantageously host Smartcard interfaces so they can act as multifunction terminals with respect to Smartcards. As a Smartcard terminal, a PC could, for example, enable point-of-sale (POS) financial transactions to be made or medical information to be taken from, or given to, a patient. To enable a PC to act as a Smartcard terminal, the host PC must be provided with a suitable hardware adapter. A suitable adapter contains a Smartcard controller and typically assumes the physical form of an expansion card coupled to the host PC's Peripheral Component Interconnect (PCI) bus.

While the PCI bus presents a nearly universal, reliable, wide, fast, open-standards bus suitable for communication with a Smartcard controller, its security does not rise to the level required for Smartcard communication, and particularly for compliance with B1. The security issue arises when the Smartcard controller is initialized. To understand the problem, one should understand how a Smartcard controller would be initialized in a host PC.

A Smartcard controller contains flash memory. During initialization, firmware for driving the controller is caused to be loaded from the PC's hard drive into Smartcard controller's flash memory. Then, in a separate action, a Smartcard driver is caused to be loaded from the PC's hard drive into the PC's main memory. An application running in the PC can then communicate with the Smartcard driver; the Smartcard driver communicates with the firmware; and the firmware communicates with a Smartcard via the Smartcard controller. The communication path is reversed for data transmitted from the Smartcard back to the application.

The security hole exists because the firmware must be loaded across the PCI bus, which as stated above is non-secure. The Smartcard controller is rendered non-secure as a result. A hacker could change the firmware before it is loaded into the flash memory and thereby create a "back door" into a financial, medical or insurance information network. To increase security, the firmware could, of course, be installed into the flash memory when the Smartcard controller is manufactured and never changed thereafter. However, that significantly impairs the flexibility and utility of the controller and is therefore unacceptable.

Accordingly, what is needed in the art is a way to improve the security of Smartcard controller initialization in a PC such that the security of the firmware loaded into the Smartcard controller is reasonably guaranteed. More specifically, what is needed in the art is a way to provide a level of security over a PCI bus that meets or exceeds B1.

SUMMARY OF THE INVENTION

To address the above-discussed deficiencies of the prior art, the present invention provides, in one aspect, a system for securing the initialization of a Smartcard controller. In one embodiment, the system includes: (1) a firmware loader associated with a Smartcard controller and configured to receive and authenticate firmware and provide an associated Smartcard driver digital signature and (2) a Smartcard driver associated with the Smartcard controller and configured to be authenticated using the Smartcard driver digital signature and authenticate the firmware.

In another aspect, the present invention provides a method of securing the initialization of a Smartcard controller. In one embodiment, the method includes: (1) receiving firmware into a Smartcard controller, the firmware including an associated Smartcard driver digital signature, (2) authenticating a Smartcard driver using the Smartcard driver digital signature and (3) authenticating the firmware with the Smartcard driver.

In yet another aspect, the present invention provides a Smartcard terminal. In one aspect, the Smartcard terminal includes: (1) a host computer having a disk drive, a PCI bus and a Smartcard controller, (2) a firmware loader associated with the Smartcard controller and configured to receive firmware from the disk drive via the PCI bus, authenticate the firmware and provide an associated Smartcard driver digital signature and (3) a Smartcard driver associated with the Smartcard controller and configured to be authenticated using the Smartcard driver digital signature and authenticate the firmware.

The foregoing has outlined preferred and alternative features of the present invention so that those skilled in the art may better understand the detailed description of the invention that follows. Additional features of the invention will be described hereinafter that form the subject of the claims of the invention. Those skilled in the art should appreciate that they can readily use the disclosed conception and specific embodiment as a basis for designing or modifying other structures for carrying out the same purposes of the present invention. Those skilled in the art should also realize that such equivalent constructions do not depart from the spirit and scope of the invention.

BRIEF DESCRIPTION OF THE DRAWINGS

For a more complete understanding of the present invention, reference is now made to the following descriptions taken in conjunction with the accompanying drawings, in which.

DETAILED DESCRIPTION

Figure 1:
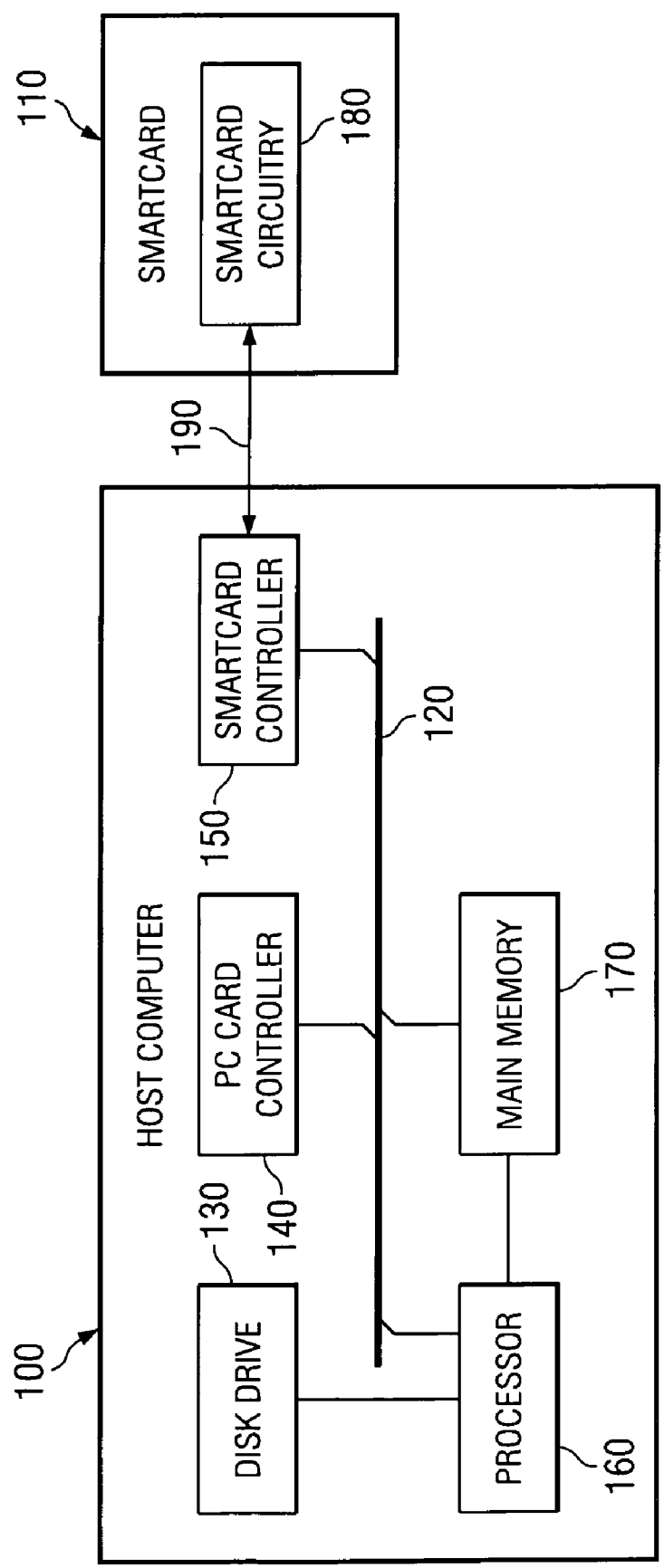
FIG. 1 illustrates a block diagram of one embodiment of a Smartcard terminal including a system for securing the initialization of a Smartcard controller constructed according to the principles of the present invention.

Referring initially to FIG. 1, illustrated is a block diagram of one embodiment of a Smartcard terminal. The Smartcard terminal includes a system for securing the initialization of a Smartcard controller constructed according to the principles of the present invention.

FIG. 1 illustrates two cooperating pieces of hardware: the Smartcard terminal, which takes the form of a host computer 100, and a Smartcard 110. In the illustrated embodiment, the host computer 100 is a PC and has a disk drive 130, a PC Card controller 140, a Smartcard controller 150, a processor 160 and main memory 170. While the PC may have more than one bus for interconnecting especially the disk drive 130, processor 160 and main memory 170, FIG. 1 illustrates a PCI bus 120. The PCI bus 120 is shown as interconnecting the PC Card controller 140, the Smartcard controller 150, the processor 160 and the main memory 170 (ostensibly to support direct memory access, or DMA). The disk drive 130 is not shown as being coupled directly to the PCI bus 120, because the disk drives of most PCs are not so coupled. However, this need not be the case. Further, those skilled in the art should understand that the present invention is not limited to a PCI bus, and may be practiced with respect to any conventional or later-developed bus.

The Smartcard 110 contains Smartcard circuitry 180. Those skilled in the pertinent art are familiar with the types of Smartcard circuitry 180 typically provided on a Smartcard. The Smartcard circuitry 180 communicates with the Smartcard controller 150 via a conventional cardbus 190.

Returning to the host computer 100, those skilled in the pertinent art are familiar with the structure, function and capabilities of the PCI bus 120; it is conventional in all respects. Those skilled in the pertinent art are also aware that the PCI bus 120 is inherently non-secure. As a result, the PC Card controller 140 and the Smartcard controller 150 are also non-secure.

Since Smartcards are designed to convey confidential or sensitive information, it is important that the Smartcard controller 150 be rendered secure in all aspects of its operation. The cardbus 190 is considered secure at all times. Following initialization, the Smartcard controller 150 is capable of employing data encryption, allowing it to scramble any data it may communicate over the PCI bus 120. However, the Smartcard controller 150 does not have encryption capability during its initialization (when its firmware and associated driver are being installed). Thus, the present invention is directed to increasing the security of the initialization process of the Smartcard controller 150.

The disk drive 130, processor 160 and main memory 170 may be conventional or of any later-developed type. In the illustrated embodiment, the processor 160 is capable of executing Microsoft Windows®, which is an almost universally used operating system. The present invention is not limited to a particular size, speed or architecture for the disk drive 130, processor 160 and main memory 170 and is operable with respect to any conventional or later-developed operating system. Likewise, the PC Card controller 140 and Smartcard controller are conventional. In fact, the PC Card controller 140 and Smartcard controller may reside in a single integrated circuit (IC) and therefore be located on a single PCI expansion card. Such an IC is commercially available item PCI-7510 from Silicom Connectivity Solutions of Kfar-Sava, Israel.

Having described an exemplary Smartcard terminal, a secure initialization process can now be described. Accordingly, turning to FIG. 2, illustrated is a diagram showing how firmware and a Smartcard driver may be securely loaded and initialized in a host computer.

Figure 2:
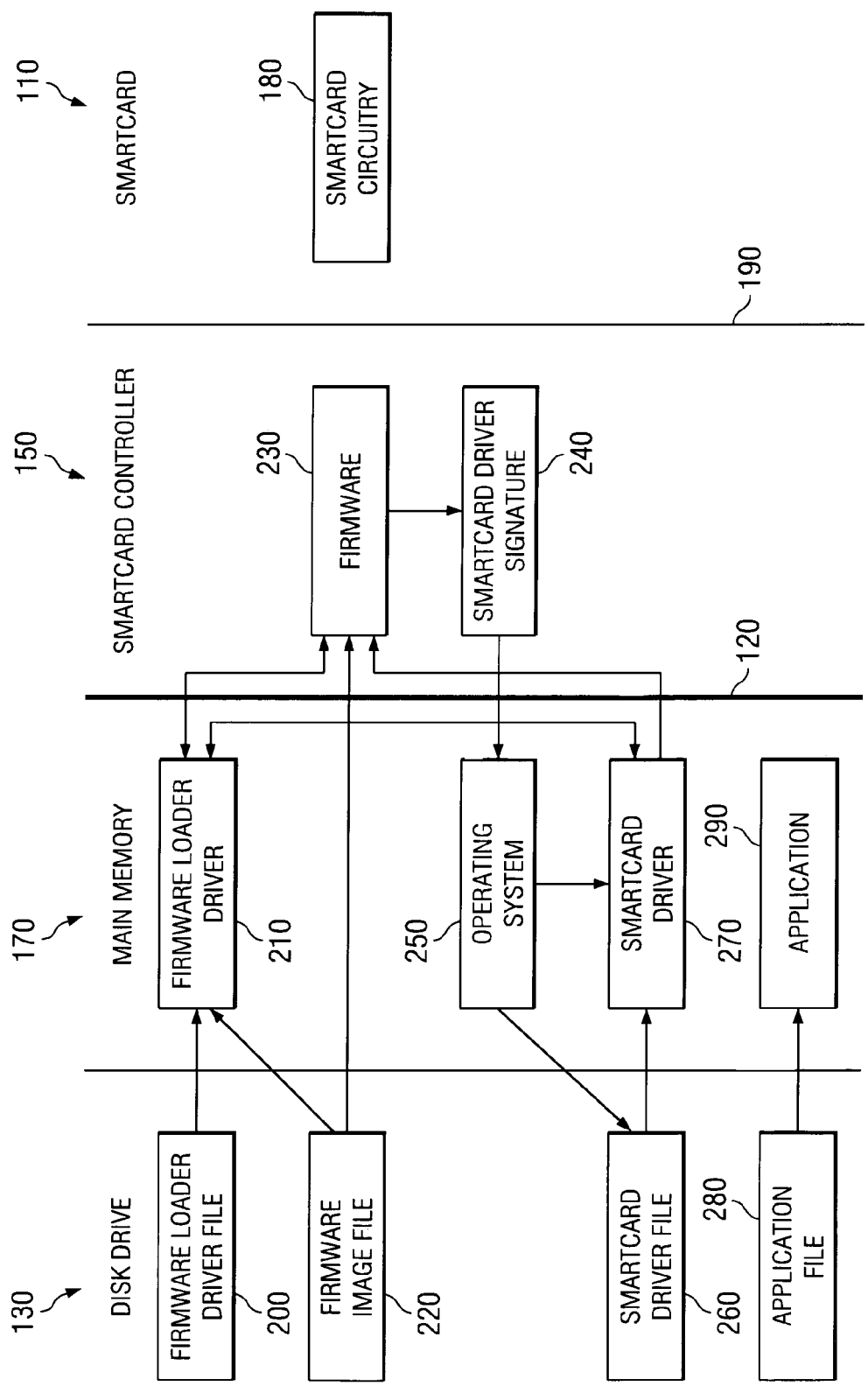
FIG. 2 illustrates a diagram showing how firmware and a Smartcard driver may be securely loaded and initialized in a host computer.

FIG. 2 is highly schematic and is designed to represent the flow of software objects, components or modules during initialization. Accordingly, FIG. 2 shows four "domains:" the disk drive 130, the main memory 170, the Smartcard controller 150 and the Smartcard 110, as set forth in FIG. 1. The PCI bus 120 interposes the domains of the disk drive 130 and the main memory 170 and the domains of the Smartcard controller 150 and the Smartcard 110. The cardbus 190 interposes the domains of the Smartcard controller 150 and the Smartcard 110.

Five software components are assumed to be in initial positions before initialization begins. First, an operating system 250 is assumed to have been loaded into the main memory 170 and to be executing. Second, the disk drive 130 is assumed to contain a firmware loader driver file 200, a firmware image file 220, a Smartcard driver file 260 and at least one application file 280.

As will be seen, the firmware image file 220 and the Smartcard driver file 260 are tightly associated with one another in that each contains information necessary and sufficient to authenticate the other. For example, Microsoft provides a service, called "Windows Hardware Quality Labs" (WHQL), that can digitally sign counterpart firmware image files and Smartcard driver files so they are tightly associated with one another. In the illustrated embodiment of the present invention, the firmware loader driver file 200 is also associated with the Smartcard driver file 260 in that the Smartcard driver file 260 contains information necessary and sufficient to authenticate the firmware loader driver file 200.

When initialization of the Smartcard controller 150 begins, the firmware loader driver file 200 is loaded into the main memory 170, resulting in a firmware loader driver 210. It should be stated at this point that the operating system 250 can afford an additional degree of security to the loading of the firmware 230 if it limits the rights of users with respect to loading drivers. Microsoft Windows® XP, for example, allows only users having administrator rights to load drivers. Thus, unauthorized driver modifications are wholly unavailable to non-administrators.

The firmware loader driver 210 is executed, causing the firmware image file 220 to begin to be downloaded via the non-secure PCI bus 120 into flash memory (not shown) contained within the Smartcard controller 150, resulting in firmware 230. The operating system 250 is assumed to contain conventional mechanisms for loading and executing hardware drivers; the illustrated embodiment of the present invention can employ these mechanisms without modification.

The firmware image file 220 is digitally signed. Accordingly, the firmware loader driver 210 employs the digital signature of the firmware image file 220 to authenticate the firmware 230. The digital signature may be a WHQL digital signature. Those skilled in the pertinent art are familiar with digital signatures and their use. At this point, the firmware 230 makes a Smartcard driver digital signature 240 available for external access (perhaps by loading it into an externally readable memory location).

The operating system 250, which again is assumed to be executing in the main memory 170, causes the Smartcard driver file 260 to begin to be loaded into the main memory 170, resulting in a Smartcard driver 270. Like the firmware image file 220, the Smartcard driver file 260 is digitally signed. The operating system 250 employs both the Smartcard driver digital signature 240 and the digital signature of the Smartcard driver file 260 (which is probably identical to the Smartcard driver digital signature 240) to authenticate the Smartcard driver 270. Assuming the Smartcard driver 270 successfully authenticates by way of both the Smartcard driver digital signature 240 and the digital signature of the Smartcard driver file 260, the Smartcard driver 270 is considered loaded.

At this point, the firmware 230 has helped to authenticate the Smartcard driver 270. It is now time for the Smartcard driver 270 to authenticate the firmware 230. Accordingly, the Smartcard driver 270 contains a digital signature corresponding to the firmware 230. The Smartcard driver 270 uses that digital signature to authenticate the firmware 230. In the illustrated embodiment, the firmware 230 is capable of transmitting a copy of itself to the Smartcard driver 270 for purposes of authentication. Also in the illustrated embodiment, the Smartcard driver 270 further authenticates, by means of digital signature, the firmware loader driver 210 that originally loaded the firmware 230.

Assuming the firmware 230 successfully authenticates by way of both the digital signature contained in the firmware image file 210 and the digital signature contained in the Smartcard driver 270 (and optionally further assuming that the firmware loader driver 210 has been authenticated), the firmware 230 is considered loaded. In the illustrated embodiment, it is only at this point, when both the firmware 230 and the Smartcard driver 270 are considered loaded by virtue of their full authentication, that the Smartcard controller 150 is advertised as being available to the operating system 250.

In a process that is in all likelihood independent of the above-described process, at least one application file 280 is loaded into the main memory 170 and becomes an executing application 290. It is assumed that the application 290 is to communicate with one or more Smartcards. In the illustrated embodiment of the present invention, the Smartcard terminal presents a Card Terminal-Application Programming Interface (CT-API)—compatible interface to the application 290 that allows the application 290 to communicate with synchronous Smartcards.

It should be stated that the CT-API is, in the illustrated embodiment, closely tied with the firmware 230; calls by the CT-API to the firmware are to specific addresses and are tested with respect to response time, requiring timely responses by the firmware 230. Any unauthorized modification to the firmware 230 would have to be made with detailed knowledge of the CT-API and its response time requirements and is therefore unlikely.

In the context of FIG. 2, such communication is by way of the operating system 250, the Smartcard driver 270, the firmware 230 and ultimately to the Smartcard circuitry 180. Having initialized, the Smartcard driver 270 and the firmware 230 are capable of encrypting their communication across the PCI bus 120, and security is maintained.

Figure 3:
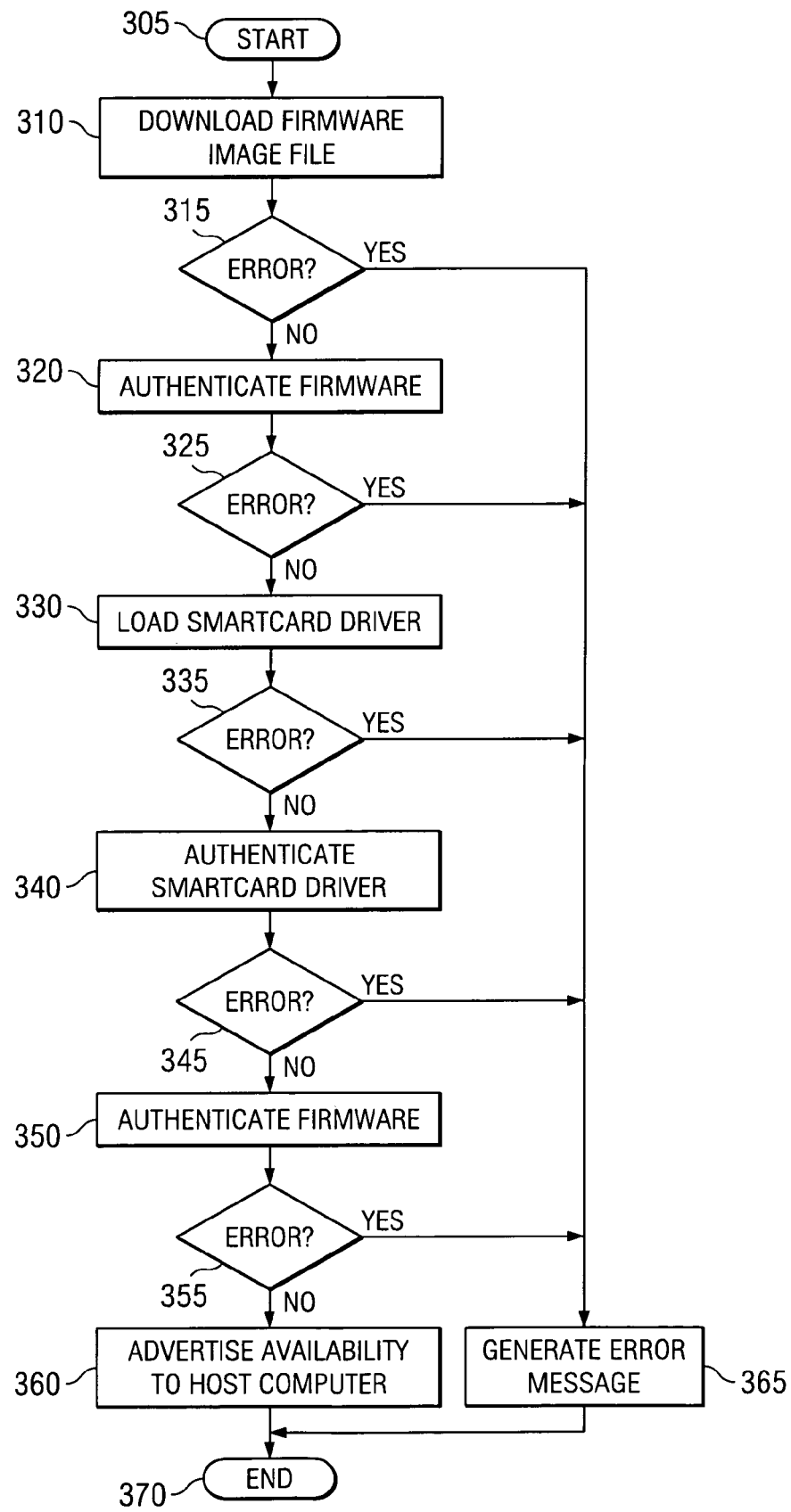
FIG. 3 illustrates a flow diagram of one embodiment of a method of securing the initialization of a Smartcard controller carried out according to the principles of the present invention.

Turning now to FIG. 3, illustrated is a flow diagram of one embodiment of a method of securing the initialization of a Smartcard controller carried out according to the principles of the present invention. The method begins in a start step 305, in which it is desired to initialize a Smartcard controller in a secure manner.

The method proceeds to a step 310, in which a firmware image file is downloaded into the Smartcard controller. In a decisional step 315, it is determined whether the download was successful.

If so, the method proceeds to a step 320, in which the firmware so downloaded is authenticated. In one embodiment, the firmware is authenticated by way of a digital signature received along with the firmware. A Smartcard driver digital signature is also made available as described above. In a decisional step 325, it is determined whether authentication has occurred without error.

The method proceeds to a step 330, in which a Smartcard driver file is loaded into the host computer's main memory. In a decisional step 335, it is determined whether the load was successful.

If so, the method proceeds to a step 340, in which the Smartcard driver so loaded is authenticated. In one embodiment, the Smartcard driver is authenticated by way of a digital signature received along with the Smartcard driver. The Smartcard driver is further authenticated by using the Smartcard driver digital signature that was made available in the step 320. In a decisional step 345, it is determined whether authentication has occurred without error.

If so, the method proceeds to a step 350, in which the Smartcard driver authenticates the firmware (and may also authenticate the firmware loader driver). In one embodiment, the Smartcard driver authenticates the firmware by way of a digital signature contained in the Smartcard driver. In a decisional step 355, it is determined whether authentication has occurred without error.

At this point, both the firmware and the Smartcard driver are authenticated. Therefore, the availability of the Smartcard controller is advertised to the host computer's operating system in a step 360, and normal operation of the Smartcard controller can commence. The method ends in an end step 370.

If, in any of the decisional steps 315, 325, 335, 345, 355, an error is found to have occurred in either downloading, loading or authentication, an error message (perhaps dependent upon the nature of the error) is generated in a step 365, and the method ends in the end step 370 without having advertised the availability of the Smartcard controller to the host computer's operating system.

Although the present invention has been described in detail, those skilled in the art should understand that they can make various changes, substitutions and alterations herein without departing from the spirit and scope of the invention in its broadest form.

What is claimed is:

1. A system for securing the initialization of a Smartcard controller, comprising:

a firmware loader associated with a Smartcard controller and configured to receive and authenticate firmware and provide an associated Smartcard driver digital signature; the firmware loader loading the firmware and digital signature into the Smartcard controller; and a Smartcard driver associated with said Smartcard controller and configured to be authenticated using said Smartcard driver digital signature by the Smartcard controller, and wherein the Smartcard driver subsequently reauthenticates the firmware.

2. The system as recited in claim 1 wherein said firmware loader receives said firmware via a Peripheral Component Interconnect (PCI) bus.

3. The system as recited in claim 1 wherein said firmware loader authenticates said firmware with a firmware digital signature received therewith.

4. The system as recited in claim 1 wherein an operating system of a host computer authenticates said Smartcard driver with said Smartcard driver digital signature.

5. The system as recited in claim 1 wherein said Smartcard controller is advertised as available to a host computer only after said firmware loader Smartcard driver is authenticated using said Smartcard driver digital signature and authenticates said firmware.

6. The system as recited in claim 1 wherein said firmware loader receives said firmware as a firmware image.

7. A method of securing an initialization of a Smartcard controller, comprising:
   receiving authenticated firmware into a Smartcard controller, said firmware including an associated Smartcard driver digital signature;
   authenticating a Smartcard driver via the Smartcard controller using said Smartcard driver digital signature; and
   reauthenticating said firmware with said Smartcard driver.

8. The method as recited in claim 7 wherein said receiving comprises receiving said firmware via a Peripheral Component Interconnect (PCI) bus.

9. The method as recited in claim 7 further comprising authenticating said firmware with a firmware digital signature received therewith.

10. The method as recited in claim 7 wherein said authenticating said Smartcard driver comprises authenticating said Smartcard driver using an operating system of a host computer.

11. The method as recited in claim 7 wherein said authenticating said firmware comprises authenticating said firmware with a firmware digital signature included in said Smartcard driver.

12. The method as recited in claim 7 further comprising advertising said Smartcard controller as available to a host computer only after carrying out said receiving, said authenticating said Smartcard driver and said authenticating said firmware.

13. The method as recited in claim 7 wherein said receiving comprises receiving said firmware as a firmware image.

14. A Smartcard terminal, comprising:
   a host computer having a disk drive, a Peripheral Component Interconnect (PCI) bus and a Smartcard controller;
   a firmware loader associated with said Smartcard controller and configured to receive firmware from said disk drive via said PCI bus, authenticate said firmware and provide the firmware and an associated Smartcard driver digital signature to the Smartcard controller; a Smartcard driver associated with said Smartcard controller and configured to be authenticated using said Smartcard driver digital signature; and wherein the Smartcard driver reauthenticates the firmware.

15. The Smartcard terminal as recited in claim 14 wherein said firmware loader authenticates said firmware with a firmware digital signature received therewith.

16. The Smartcard terminal as recited in claim 14 wherein an operating system of said host computer authenticates said Smartcard driver with said Smartcard driver digital signature.

17. The Smartcard terminal as recited in claim 14 wherein said Smartcard driver authenticates said firmware with a firmware digital signature included in said Smartcard driver.

18. The Smartcard terminal as recited in claim 14 wherein said Smartcard controller is advertised as available to said host computer only after said firmware loader Smartcard driver is authenticated using said Smartcard driver digital signature and authenticates said firmware.

19. The Smartcard terminal as recited in claim 14 wherein said firmware loader receives said firmware as a firmware image.

* * * * *